United States Patent [19]
Cullis-Hill

[11] Patent Number: 4,879,375
[45] Date of Patent: Nov. 7, 1989

[54] PREPARATION OF HYALURONIC ACID FROM SYNOVIAL FLUID

[76] Inventor: David Cullis-Hill, 111 Bronte Road, Bondi Junction N.S.W., Australia, 2022

[21] Appl. No.: 2,699
[22] PCT Filed: May 7, 1986
[86] PCT No.: PCT/AU86/00129
 § 371 Date: Feb. 9, 1987
 § 102(e) Date: Feb. 9, 1987
[87] PCT Pub. No.: WO86/06728
 PCT Pub. Date: Nov. 20, 1986

[30] Foreign Application Priority Data
 May 9, 1985 [AU] Australia .............................. PH0496

[51] Int. Cl.$^4$ ........................ C07H 5/04; C07G 17/00
[52] U.S. Cl. .................................... 536/55.1; 536/124
[58] Field of Search ............................... 536/55.1, 124

[56] References Cited
U.S. PATENT DOCUMENTS

| | | | |
|---|---|---|---|
| 2,599,172 | 6/1952 | Hadidian | 536/55.1 |
| 3,211,616 | 10/1965 | Yosizawa | 536/55.1 |
| 3,396,081 | 8/1968 | Billek | 536/55.1 |
| 4,141,973 | 2/1979 | Balazs | 536/55.1 |
| 4,517,295 | 5/1985 | Bracke et al. | 536/55.1 |
| 4,713,448 | 12/1987 | Balazs et al. | 536/55.1 |

Primary Examiner—Ronald W. Griffin
Assistant Examiner—Everett White
Attorney, Agent, or Firm—Nixon & Vanderhye

[57] ABSTRACT

A method for preparing high purity hyaluronic acid comprising treating a proteinaceous solution containing hyaluronic acid to precipitate protein and said hyaluronic acid from the solution, denaturing the protein, adding the hyaluronic acid and denatured protein to a solution in which the hyaluronic acid is soluble, digesting the protein and recovering hyaluronic acid.

22 Claims, No Drawings

PREPARATION OF HYALURONIC ACID FROM SYNOVIAL FLUID

The present invention relates to a method for the preparation of hyaluronic acid and more particularly to a method for producing high purity hyaluronic acid derived from the synovial fluid of selected animal species.

Hyaluronic acid is known to occur in many animal species including man. In the majority of animals, it is widely distributed in tissues and extra cellular fluid. In particular, in man, it is found in synovial fluid, the vitreous humour of the eye, Wharton's jelly of the umbilical cord and articular-bone cartilage. It also occurs in small quantities in the connective tissue of animals and in some micro-organisms.

It is to be noted that hyaluronic acid is a mucopolysaccharide and as such, the molecular weight of the compound varies between animal species and also within a single animal species depending on its location in the tissues.

Hyaluronic acid is known to perform a number of functions in man and other animals including the lubrication of the joints, the maintenance of the gel-like character of the vitreous humour of the eye and the contribution to the ground substance around cells where it functions as an inter-cellular lubricant and flexible cement.

In man, hyaluronic acid has been used to maintain the hydration and condition of the eye during various surgical procedures such as corneal grafts. More recently, because of its joint lubricant function, investigations have been directed in an attempt to elucidate its potential to alleviate the inflammatory joint conditions such as arthritis. In animals such as the horse, it is currently used as a method of treatment of imflammatory joint conditions.

In addition, because it is known to be a constituent of the ground substance of cells, hyaluronic acid is being incorporated into various cosmetic preparations for the skin. In this role it is proposed that the addition of hyaluronic acid to the skin is able to raise the level of hyaluronic acid present in the cells coats in the dermal layers thereby improving the condition of the skin.

As used in this specification, "hyaluronic acid" refers to the acid and to its metallic salts.

In the prior art, the methods of preparation of hyaluronic acid have been directed towards extraction from the tissue sources in which hyaluronic acid occurs in high concentration in man and other animal species. In particular, the coxcomb of the chicken and the human umbilical cord have been identified as suitable sources. However, the combination of these sources and the many steps required to isolate hyaluronic acid in the prior art have resulted in the cost of hyaluronic acid being exceptionally high. Further the present inventor believes that some of the prior art sources and preparation methods may result in a hyaluronic acid compound which has an unsatisfactory biological activity in man. It is postulated that the unsatisfactory activity is due to methods of preparation which disrupt the composition and structure of the molecule unduly, including producing a high level of protein impurity and a hyaluronic acid of unsatisfactory molecular weight.

Representative of the prior art is U.S. Pat. No. 4,141,973 (Balazs). This discloses a long and complex procedure for the isolation of "ultrapure" hyaluronic acid using coxcombs and human umbilical cords as the hyaluronic acid containing starting material. The basic steps in the disclosed process for the production of hyaluronic acid are (1) Cleaning and freezing starting material, slicing the frozen material and extracting the material with 95% ethanol;

(2) Extracting the material with water and chloroform;

(3) Addition of sodium chloride to the water/chloroform extracts, rejection of chloroform phase; acidification of aqueous phase to pH4-5 followed by extraction with chloroform; as an alternative to chloroform extraction, DNase or RNase enzymes may be used;

(4) Adjust pH to 6.0–7.0 and extract aqueous phase with chloroform; reject chloroform; centrifugation at 70,000 to 110,000 g may also be used; and (5) Filtration of aqueous phase through 0.2 micron filter, followed by a series of precipitations of hyaluronic acid using ethanol followed by solution into sodium chloride solution; acetone is also used as a precipitant and washing agent to obtain the desired purity of hyaluronic acid.

The present inventor has realised that the synovial fluid of some animal species represents a potentially economical source of hyaluronic acid. Such suitable animal species include sheep, cattle and pigs. By coupling such a source with a method of extraction that does not unduly damage the molecule, the present invention is able to produce a high purity hyaluronic acid having a molecular weight suitable for use in man. By high purity hyaluronic acid, it is meant hyaluronic acid having not more than five micrograms of protein per miligram of hyaluronic acid when determined by the Lowry method.

The present invention provides a method for preparing high purity hyaluronic acid comprising treating a proteinaceous solution containing hyaluronic acid to precipitate protein and said hyaluronic acid from the solution, denaturing the protein, adding the hyaluronic acid and denatured protein to a solution in which the hyaluronic acid is soluble, digesting the protein and recovering hyaluronic acid.

A preferred source of hyaluronic acid is synovial fluid obtained from the joints of suitable freshly slaughtered animals. Those animals that are suitable include cattle, sheep and pigs. Any method may be used to obtain the fluid but it is preferably accomplished using a syringe and a suitable cannula. Typically, one obtains approximately 20 mL of synovial fluid from the carpal joints of a beast the concentration of hyaluronic acid in the synovial fluid being of the order of from 1.5% to 4.0% w/v.

Depending on the source of hyaluronic acid, it may be advantageous to carry out a purification step prior to using the method of the invention. Thus, in the case of synovial fluid, following its collection, it is preferably stored at 5° C. for a week prior to any further processing. This refrigeration step facilitates the removal of high molecular weight impurities.

Thus a proteinaceous hyaluronic acid solution may be obtained by centrifuging the previously refrigerated synovial fluid preferably at 2000 rpm wherein the high molecular weight impurities are spun down. This allows the proteinaceous hyaluronic acid solution to be poured off for further processing.

It is to be noted that alternative methods may be used to remove such impurities, the methods being tailored to suit the source of hyaluronic acid and the nature and level of the high molecular weight impurities.

In a preferred embodiment of the invention, synovial fluid after having been stored at 5° C. for a week, is filtered using glass wool to remove the high molecular weight impurities.

The proteinaceous hyaluronic acid solution may be treated directly with a substance to cause precipitation of the protein and hyaluronic acid. However, it is preferred that prior to this treatment, the proteinaceous hyaluronic acid solution has added to it a metallic salt soluble in said solution. The salt is added to the proteinaceous hyaluronic acid solution to produce preferably a concentration of salt in the range of from 2 to 3 molar. In a preferred embodiment of the invention, the metallic salt is sodium chloride.

In another embodiment, a free radical inhibitor may be added to the proteinaceous hyaluronic acid solution as well as a metallic salt. A preferred inhibitor is dimethylsulfoxide, preferably in a concentration of from 2 to 3% v/v.

In another embodiment, where a free radical inhibitor has been included in the proteinaceous hyaluronic acid solution, the step of denaturation using the aforementioned acetic acid and absolute ethanol solutions is carried out with boiling of the solutions at a temperature of about 85° C.

The solution which includes the precipitate containing protein and hyaluronic acid is treated with a protein denaturing agent. Preferably, the denaturant includes a water miscible alcohol but other denaturing agents may be used, for example heat. Where alcohol is the denaturant, it is preferred that absolute ethanol is used. The denaturing agent may, however, include an acid together with an alcohol, at a concentration providing that the pH of the solution containing precipitated protein and hyaluronic acid, after the denaturing agent has been added, remains at not less than 5 and/or providing that the viscosity of the precipitated hyaluronic acid remains substantially unaltered after the denaturing agent has been added to the solution.

In a preferred embodiment, the denaturing agent includes a 2% solution of glacial acetic acid in absolute ethanol. In a particularly preferred embodiment, two volumes of a solution containing 2% glacial acetic acid in absolute ethanol is mixed with one volume of the solution containing the protein to be denatured.

It is to be noted that the steps of precipitation and protein denaturation may be accomplished simultaneously. For example, in those embodiments of the invention where an alcohol is used as the denaturant, precipitation of the protein and hyaluronic acid will also occur.

It is preferred that following the steps of precipitation and denaturation, the precipitate, which is in a stringy form, is separated from the solution by decanting off the solution, teasing the precipitate and allowing any excess solution to drain from the precipitate. At the end of this step, the level of alcohol, if used as the denaturant, should be present only as a trace. In some circumstances, the precipitate may include some metallic salt if it has been used to treat the proteinaceous hyaluronic acid solution prior to the step of precipitation. If this is present, at this stage it is preferred that it is removed by washing the precipitate, preferably with a solution that includes by volume 2% glacial acetic acid, 65% of an alcohol and 33% of a buffer having a pH of 7. The precipitate is than treated as described above.

Following the separation of the precipitated protein and hyaluronic acid, it is preferred that it is added to a solution in which hyaluronic acid is soluble and substantially stable. Preferably the solution is a buffer having a pH of 7. The hyaluronic acid is caused to dissolve in the solution whilst the protein being insoluble will be present in the solution as a milky precipitate.

Once the hyaluronic acid is in solution, it is preferred that the protein is degraded using the technique of protein digestion. The protein digestion step preferably comprises treating the hyaluronic acid solution containing the precipitated denatured protein with an enzyme capable of causing the breakdown of the denatured protein. Preferred enzymes include trypsin and pronase. It is also preferred that a free radical inhibitor is added to the solution to ensure that no degradation of the hyaluronic acid molecule occurs. A preferred free radical inhibitor is sodium azide in a concentration of 0.05 molar.

Generally the protein digestion is carried at a temperature of about 37° C. for a period of from 2 to 3 hours or until the milkiness in the solution due to the protein has been removed, the solution being substantially clear.

Following the protein digestion step it is preferred that the steps of precipitation of protein and hyaluronic acid, protein denaturation and dissolution of hyaluronic acid as hereinbefore described are repeated. At this stage, it is estimated by the present inventor that approximately 5% w/w of protein remains associated with the hyaluronic acid.

In a preferred embodiment, so obtained hyaluronic acid is further treated by centrifugation at 5 to 10,000 g, followed by filtration of the supernatant preferably through a filter having a pure size of 0.22 microns. The filtrate is then treated as outlined below.

To reduce the level of protein further, it is preferred that the steps of precipitation of protein and hyaluronic acid, protein denaturation and dissolution of hyaluronic acid as hereinbefore described are repeated. At this stage, it is estimated that the level of protein associated with the hyaluronic acid is less than 0.5% w/w.

It will be appreciated that the aforementioned steps may be repeated as required to obtain hyaluronic acid of even greater purity.

Once hyaluronic acid is obtained of desired purity, its concentration may be conveniently adjusted in solution by taking precipitated hyaluronic acid and dissolving it in the desired solvent to produce the required concentration. It is important to note that during all stages of the process of the invention, the hyaluronic acid must remain adequately hydrated, otherwise it may degrade to produce material having an unacceptable biological activity.

The present process in its preferred embodiments may be distinguished over the prior art methods through its use of a ready source of hyaluronic acid namely synovial fluid, and the recognition that protein may be effectively removed using the steps of precipitating hyaluronic acid and protein, denaturing and digesting the protein in the presence of a free radical inhibitor without damaging the hyaluronic acid molecule and repeating precipitation and denaturation until hyaluronic acid of the desired purity is achieved.

The relatively few steps used in the process of the invention together with the relatively rapid production time, with attestant cost advantages, are in marked contrast to the method disclosed in the aforementioned U.S. Pat. No. 4,141,973 (Balazs).

Hereinafter by way of example only is a preferred embodiment of the present invention:

Hyaluronic acid of high purity was prepared as follows:

One liter of synovial fluid was obtained from the joints of cattle. It was stored at 5° C. for one week and following the storage period, the synovial fluid was filtered through glass wool. To the filtrate was added sufficient sodium chloride to produce a concentration of 2 molar. The protein and hyaluronic acid present were then precipitated and the protein denatured in a single step.

This was accomplished by adding to the solution absolute ethanol containing 2% acetic acid, in a ratio of 2 volumes of 2% acetic acid ethanol solution to every volume of solution. The solution then contained precipitated hyaluronic acid and precipitated denatured protein.

The precipitate was separated from the solution by decanting and draining, the precipitate being teased apart to facilitate dissolution of the hyaluronic acid. Dissolution of the hyaluronic acid was effected in pH7 phosphate buffer. However, the protein remained present in solution as a milky precipitate.

Once the hyaluronic acid was in solution, in order to remove protein, 5 mg. of trypsin and sufficient sodium azide to produce a concentration of 0.05 molar in the solution was added to the buffer solution containing the dissolved hyaluronic acid. The digestion was carried out at 37° C. for two hours when the solution became clear indicating the completion of the reaction.

Once the protein digestion was complete, sufficient sodium chloride was added to produce a concentration of 2 molar followed by two volumes of 2% glacial acetic acid in ethanol for every volume of hyaluronic acid solution when the hyaluronic acid and some of the low molecular weight protein components were precipitated.

The precipitate was removed from solution by decanting and draining, the precipitate being teased apart to facilitate dissolution in pH7 phosphate buffer.

The above steps of precipitation with salt and 2% glacial acetic acid in ethanol following by dissolution and pH7 buffer were repeated.

The resultant hyaluronic acid solution was then evaluated by the Lowry method (Lowry et al., J. Biol. Chem. 193, 265-275 (1951) and found to contain less than 5 micrograms of protein per milligram of hyaluronic acid.

What is claimed is:

1. A method of preparing high purity hyaluronic acid with a protein impurity of less than or equal to 0.5% w/w from synovial fluid comprising the steps of:
   (a) removing high molecular weight impurities, if present, from the synovial fluid;
   (b) dissolving a metallic salt and free radical inhibitor in the synovial fluid;
   (c) precipitating hyaluronic acid and protein by adding sufficient of a water miscible alcohol to said synovial fluid;
   (d) separating the precipitate from step (c) and dissolving the hyaluronic acid contained therein in a solution in which the protein is insoluble;
   (e) adding an effective amount of a free radical inhibitor to the step (d) solution;
   (f) digesting the protein by treating said solution with an effective enzyme at a temperature of about 37° C. for a period of from 2 to 3 hours; and
   (g) recovering hyaluronic acid.

2. A method as claimed in claim 1, wherein the synovial fluid has been stored for a week at about 5° C.

3. A method as claimed in claim 2, wherein after storage the synovial fluid is centrifuged to remove high molecular weight impurities.

4. A method as claimed in claim 2, wherein after storage the synovial fluid is filtered through glass wool to remove high molecular weight impurities.

5. A method as claimed in claim 1, in which sufficient metallic salt is added to the synovial fluid to produce a concentration in the synovial fluid of from 2 to 3 molar.

6. A method as claimed in claim 5, wherein the metallic salt is sodium chloride.

7. A method as claimed in claim 6, wherein the free radical inhibitor used in step (b) is dimethylsulfoxide in a concentration of from 2 to 3% v/v.

8. A method as claimed in claim 1, wherein the water miscible alcohol is absolute ethanol.

9. A method as claimed in claim 8, wherein an acid is included with the ethanol in a concentration such that the pH of the solution after the addition of the ethanol and acid is not less than 5.

10. A method as claimed in claim 9, wherein the acid is acetic acid in a concentration of 2% in absolute ethanol.

11. A method as claimed is claim 10, wherein two volumes of said acetic acid solution is mixed with one volume of synovial fluid.

12. A method as claimed in claim 11, wherein the solution is boiled following the addition of acid and ethanol.

13. A method as claimed in claim 1, wherein the precipitate is separated from the solution by decanting off the solution, teasing the precipitate and allowing excess solution to drain therefrom.

14. A method as claimed in claim 13, wherein the separated precipitate is washed with a solution comprising by volume, 2% acetic acid, 65% of an alcohol, and 33% of a buffer having a pH of 7.

15. A method as claimed in claim 13, wherein the separated denatured protein and hyaluronic acid is added to a solution in which the hyaluronic acid is soluble.

16. A method as claimed in claim 1, wherein the enzyme is selected from the group consisting of trypsin and pronase.

17. A method as claimed in claim 16, in which a free radical inhibitor is included in the solution to be digested.

18. A method as claimed in claim 17, wherein the free radical inhibitor is sodium azide in a concentration of 0.05 molar.

19. A method as claimed in claim 18, wherein after protein digestion is complete, steps (b)–(f) are repeated on the digested solution.

20. A method as claimed in claim 19, wherein after completion of step (f) the digested solution is centrifuged at 5,000 to 10,000 g, and the supernatant obtained therefrom is filtered through a 0.22 micron filter.

21. A method as claimed in claim 20, wherein the steps (b), (c), (d), (e) and (f) are repeated on the filtered solution.

22. A method as claimed in claim 1, wherein the hyaluronic acid in step (g) is recovered by precipitation.

* * * * *